United States Patent
Waggoner et al.

(10) Patent No.: US 11,729,418 B1
(45) Date of Patent: Aug. 15, 2023

(54) CONTENT ADAPTIVE ENCODING

(71) Applicant: Amazon Technologies, Inc., Seattle, WA (US)

(72) Inventors: Charles Benjamin Franklin Waggoner, Portland, OR (US); Marc Joliveau, Seattle, WA (US); Srikanth Kiran Kotagiri, Bothell, WA (US); Yongjun Wu, Bellevue, WA (US); Yang Yang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 17/305,443

(22) Filed: Jul. 7, 2021

Related U.S. Application Data

(63) Continuation of application No. 15/195,810, filed on Jun. 28, 2016, now Pat. No. 11,089,329.

(51) Int. Cl.
*H04N 19/11* (2014.01)
*H04N 19/58* (2014.01)
*H04N 19/177* (2014.01)
*H04N 19/577* (2014.01)

(52) U.S. Cl.
CPC ........... *H04N 19/58* (2014.11); *H04N 19/177* (2014.11); *H04N 19/577* (2014.11)

(58) Field of Classification Search
CPC .... H04N 19/58; H04N 19/177; H04N 19/577; H04N 19/11
See application file for complete search history.

(56) References Cited

U.S. PATENT DOCUMENTS

| | | | |
|---|---|---|---|
| 5,990,955 A | 11/1999 | Koz | |
| 2005/0015259 A1* | 1/2005 | Thumpudi | G10L 19/24 704/E19.044 |
| 2006/0239348 A1 | 10/2006 | Zhang et al. | |
| 2008/0192822 A1 | 8/2008 | Chang et al. | |
| 2012/0219054 A1 | 8/2012 | Daub et al. | |
| 2013/0042015 A1 | 2/2013 | Begen et al. | |
| 2013/0077674 A1 | 3/2013 | Kim | |
| 2013/0156098 A1 | 6/2013 | Schwartz et al. | |
| 2013/0163667 A1 | 6/2013 | Nilsson et al. | |
| 2013/0282915 A1 | 10/2013 | Patel et al. | |
| 2016/0198012 A1* | 7/2016 | Fablet | H04L 67/55 709/231 |
| 2016/0198166 A1* | 7/2016 | Kudana | H04N 19/11 375/240.15 |

(Continued)

FOREIGN PATENT DOCUMENTS

| WO | WO 2005/036886 | 4/2005 |
|---|---|---|
| WO | WO 2008/051517 | 5/2008 |

OTHER PUBLICATIONS

U.S. Appl. No. 15/195,810, filed Jun. 28, 2016, Waggoner et al.

(Continued)

*Primary Examiner* — Patrick E Demosky
(74) *Attorney, Agent, or Firm* — Weaver Austin Villeneuve & Sampson LLP

(57) ABSTRACT

Techniques are described for adaptive encoding different portions of media content based on content. Characteristics of GOPs of media content can be determined and used to set encoding parameters for the GOs. The GOPs can be encoded such that one GOP is encoded differently than another GOP if they have different characteristics.

20 Claims, 3 Drawing Sheets

(56) References Cited

U.S. PATENT DOCUMENTS

2016/0261869 A1    9/2016  Mammou et al.
2018/0007395 A1    1/2018  Ugur et al.
2020/0267429 A1    8/2020  He et al.

OTHER PUBLICATIONS

U.S. Office Action dated Feb. 22, 2018 issued in U.S. Appl. No. 15/195,810.
U.S. Final Office Action dated Sep. 6, 2018 issued in U.S. Appl. No. 15/195,810.
U.S. Office Action dated Feb. 14, 2019 issued in U.S. Appl. No. 15/195,810.
U.S. Final Action dated Jun. 26, 2019 issued in U.S. Appl. No. 15/195,810.
U.S. Office Action dated Nov. 27, 2019 issued in U.S. Appl. No. 15/195,810.
U.S. Final Office Action dated May 14, 2020 issued in U.S. Appl. No. 15/195,810.
U.S. Office Action dated Oct. 1, 2020 issued in U.S. Appl. No. 15/195,810.
U.S. Notice of Allowance dated Apr. 21, 2021 issued in U.S. Appl. No. 15/195,810.

* cited by examiner

CONTENT ADAPTIVE ENCODING

RELATED APPLICATION DATA

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Consumers have an ever-increasing array of options for consuming media content, in terms of the types of media content (e.g., video, audio, text, etc.), providers of the media content, and devices for consuming media content. Media content providers are becoming increasingly sophisticated and effective at providing media content quickly and reliably to consumers.

Media content is typically encoded, which includes using compression algorithms to reduce the number of bits needed to transmit the media content to a viewer's device where it is decoded for playback. A set of encoding parameters can be used during the encoding process. Unfortunately, using a single set of encoding parameters for encoding the entire media content might not provide the best encoding for some scenes of the media content.

DETAILED DESCRIPTION

This disclosure describes media content encoding techniques for selecting encoding parameters for different portions of media content. For example, media content is often encoded, resulting in a compressed bitstream representing a version of that media content. The encoding process includes using a set of encoding parameters as settings that dictate whether certain capabilities of the encoder are enabled or the value of some of the encoding parameters that influence the encoding process. The entire media content can be encoded with the same set of encoding parameters.

However, using the same set of encoding parameters for the entire media content might not provide the best selection of the encoding parameters for different portions of the media content. For example, in video encoding, media content is composed of groups of pictures (GOPs). Each GOP is a group of successive image frames in the bitstream. The entire encoded media content is a group of successive GOPs.

Different GOPs of the encoded media content might provide playback of different types of content. For example, some GOPs might provide playback of live action scenes while some other GOPs might provide playback of animated (e.g., cel animation, computer-generated imagery (CGI) animation, etc.) of the same media content. The portions of the media content represented by the different GOPs might also have different noise, image characteristics, quality, motion, and other characteristics. These portions with different characteristics might need different encoding parameters to provide a higher quality encoding.

In some implementations, characteristics of the different GOPs of media content can be determined in a first pass of an encoding process. In a second pass of the encoding process, the encoding parameters for the different GOPs can be set based on the characteristics. As a result, different GOPs can be encoded with different sets of encoding parameters.

Figure 1:
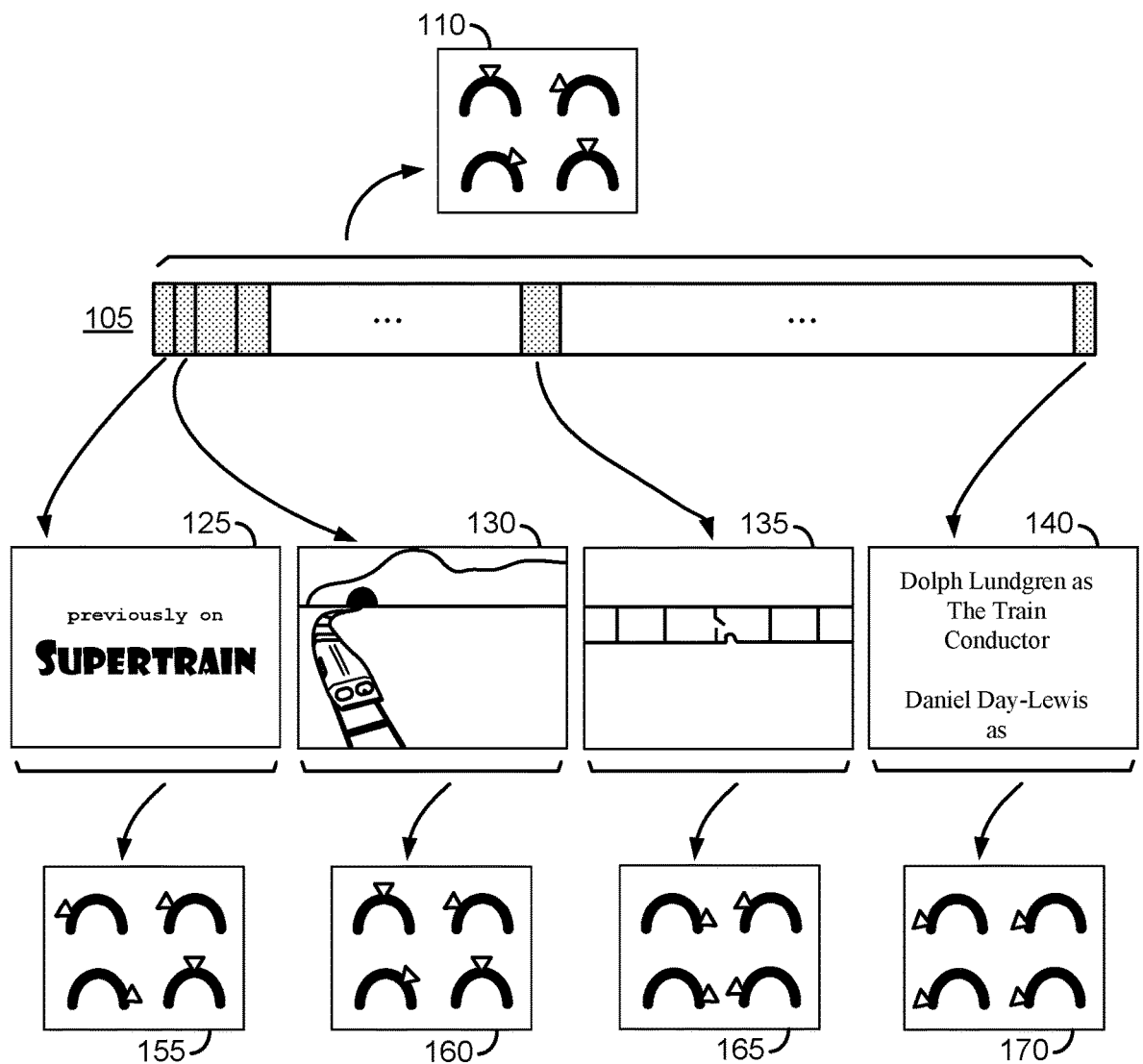
FIG. 1 illustrates an example of encoding groups of pictures (GOPs) of media content with different parameter settings.

In more detail, FIG. 1 illustrates an example of encoding groups of pictures (GOPs) of media content with different parameter settings. In FIG. 1, media content 105 includes several portions providing different segments of playback. Each of the portions can be a GOP. For example, the first GOP 125 provides the opening credits shown at the beginning of the playback of media content 105 and listing the title, notable cast members, notable production members, etc. GOP 130 is a computer-generated image (CGI) animation sequence of a scene of media content 105. GOP 135 is a live-action scene of media content 105. Lastly, GOP 140 is the closing or end credits providing a scrolling list of all of the cast members and production members.

In some scenarios, encoding parameters 110 can be applied to the entirety of media content 105. That is, encoding parameters 110 can be applied to GOPs 125, 130, 135, and 140 of media content 105, resulting in each of the GOPs being encoded with the same set of encoding parameters. For example, during the encoding process, a first pass analyzing media content 105 might be performed to determine the set of encoding parameters to be applied to each GOP of media content 105. The determined set of encoding parameters might be generalized (e.g., averaged) from the different characteristics of the GOPs. For example, if more of the GOPs provide playback of CGI or cel animated scenes than the GOPs providing playback of live-action scenes, then a parameter setting such as the quantization parameter (e.g., representing a factor applied to residual coefficients that indicate differences in image content between a portion and another portion, or coding units, of an image frame to scale down the residual coefficients as a compression technique) can be selected to provide better encoding of the GOPs including CGI or animated scenes. However, the GOPs including live-action content might not be encoded as well since the parameter settings for live-action content should be different from CGI or animated content. For example, encoding live-action content would be better with a different quantization parameter than the one used for encoding animated content.

In FIG. 1, rather than applying encoding parameters 110 to all of the GOPs of media content 110, different parameter settings can be applied to the GOPs. For example, in FIG. 1, parameter settings 155 can be used to encode GOP 125. Likewise, parameters settings 160 can be used to encode GOP 130, parameter settings 165 can be used to encode GOP 135, and parameters settings 170 can be used to encode GOP 140. The values for the parameter settings might be different (portrayed as gauges being dialed to different values) to account for the different characteristics of the GOPs. For example, since GOP 140 merely includes scrolling text representing the closing credits for media content 105, a high quantization parameter might be selected as one of parameter settings 170. This might be done because the quality of closing credits does not need to be very high since it is only text, and therefore, using a higher quantization parameter can provide a more compressed bitstream for GOP 140. By contrast, parameter settings 160 used to encode GOP 130 might use a lower quantization parameter as the CGI sequence might be best encoded with more bits (i.e., less compression than GOP 140). As a result, each of the GOPs can be encoded using encoding parameters selected based on the characteristic of the GOPs. This allows for a more selective encoding process, providing better compression and/or better video quality for GOPs.

Figure 2:
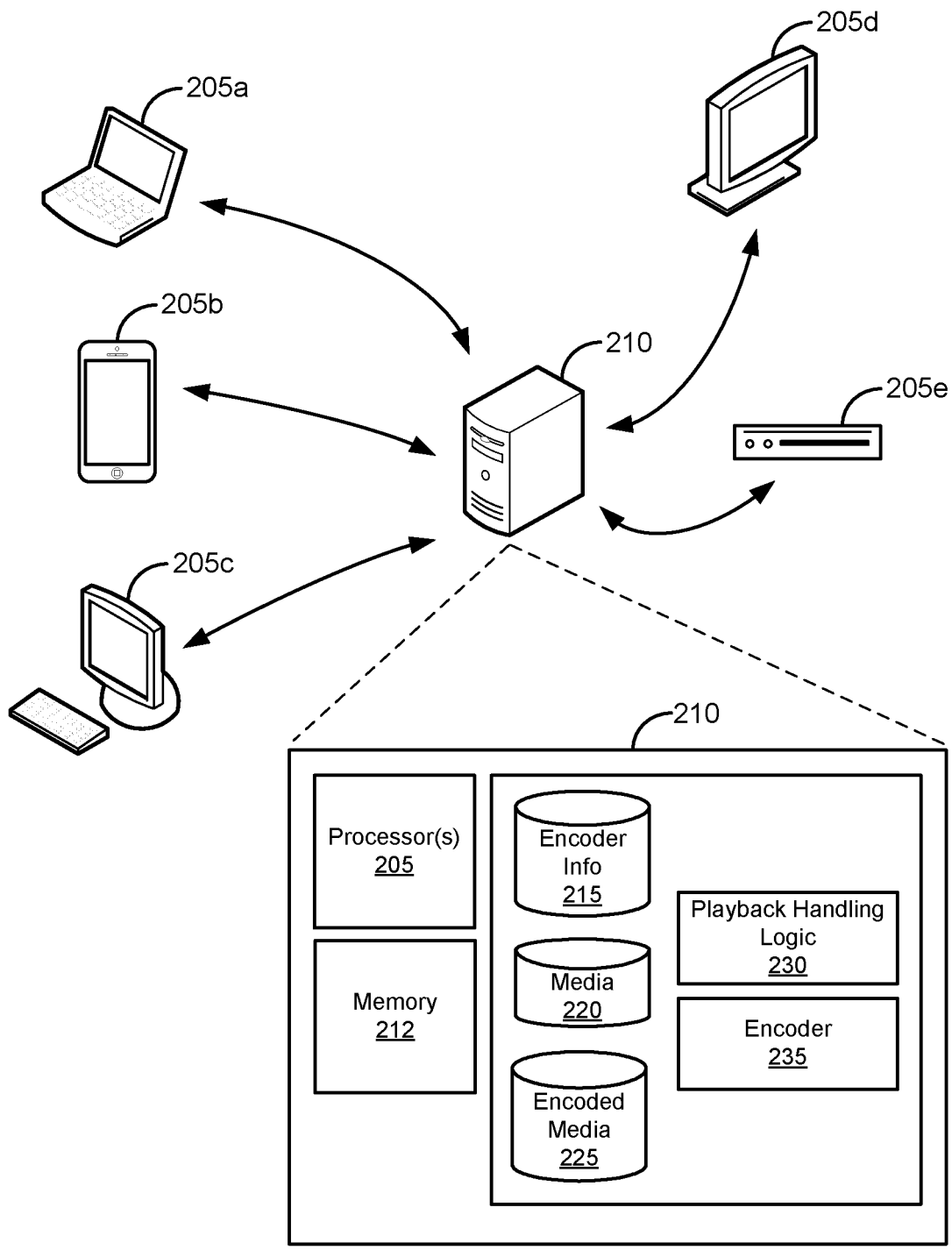
FIG. 2 illustrates an example of a computing environment for encoding GOPs of media content.

FIG. 2 illustrates an example of a computing environment for encoding GOPs of media content. The computing environment of FIG. 2 includes encoding server 210 that can be used to encode and provide media content to viewer devices 205a-e. Viewer devices 205a-e can decode the encoded media content for playback on a display screen.

In FIG. 2, viewer device 205a is a set-top box, viewer device 205b is a laptop computer, viewer device 205c is a smartphone, viewer device 205d is a television, and viewer device 205e is a desktop computer. However, related functionality may also be implemented within tablets, wearable devices, virtual or augmented reality headsets, video game consoles, etc.

Encoding server 210 can conform to any of a wide variety of architectures and its functionality may be implemented by a variety of servers. For example, one server might encode media content and the encoded media content might be provided to another server, for example, belonging to a content delivery network (CDN). As such, the functionality and components of encoding server 210 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the encoding and delivery of media content and data related to the media content, including content providers, internet service providers (ISPs), providers of content delivery networks (CDNs), etc. The functionality described herein also may be implemented by one or more different entities. For example, the functionality to provide playback of media content can be integrated into a video player or software client under control of one entity (e.g., on viewer devices 205a-e), integrated into a separate app from another entity, implemented in an edge server or content server of a CDN, a server of an ISP, etc.

It should be noted that, despite references to particular computing paradigms and software tools herein, the computer program instructions on which various implementations disclosed herein are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

In FIG. 2, encoding server 210 can include various types of logic used to implement encoder 235 to encode media content stored in media content 220 using data representing characteristics of GOPs in encoder info 215. The encoded media content is then stored in memory such as encoded media content 225. Encoding server 210 also implements playback handling logic 230 to provide requested manifest files to viewer devices 205a-e so that they can request the encoded media content for playback. Encoding server 210 can include one or more processor circuits 205, memory 212, and other hardware components to encode media content and provide the encoded media content to viewer devices 205a-e. For example, processor circuits 205 can execute stored instructions in memory 212 of encoding server 210 to implement encoding techniques disclosed herein.

Viewer devices 205a-e can also include various types of logic used to implement a decoder to decode the encoded media content received from encoding server 210 and store the decoded media, as well as playback handling logic to request manifest files and store the manifest files, and request fragments of the encoded media content based on the manifest files. Viewer devices 205a-e can include one or more processors, memory, and other hardware components to request and decode the encoded media content provided by encoding server 210. For example, the processors of viewer devices 205a-e can execute stored instructions in memory of the corresponding viewer device to implement decoding techniques based on the encoding techniques disclosed herein.

Figure 3:
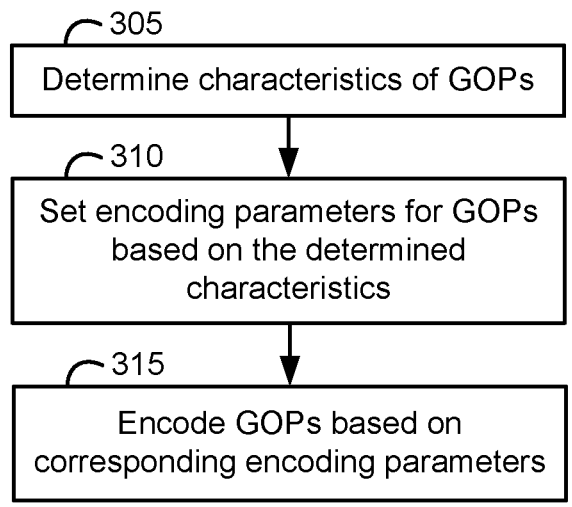
FIG. 3 is a flowchart illustrating an example of encoding GOPs of media content.
Figure 4:
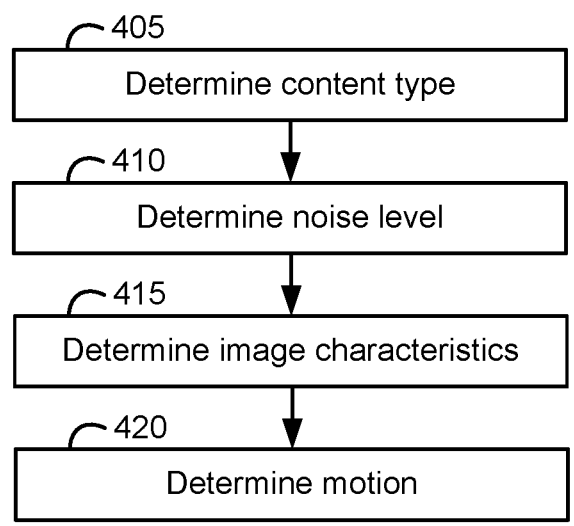
FIG. 4 illustrates an example of determining characteristics of GOPs of media content.

A specific implementation will now be described with reference to FIG. 1, the computing environment of FIG. 2, and the flow diagrams of FIGS. 3 and 4. In FIG. 3, encoder 215 of encoding server 210 performs a first-pass encoding to determine characteristics of the GOPs of media content (305). The determined characteristics can then be stored, for example, in encoder info 215 of FIG. 2.

For example, some media content can be encoded with multi-pass encoding, such as two-pass encoding. In two-pass encoding, a first stage of the encoding process can collect, or determine, various characteristics of the media content. A second stage of the two-pass encoding then encodes the media content using the characteristics determined during the first-pass. As a result, a higher quality or better compressed encode of the media content can be generated since the encoding is based on the various characteristics of the media content itself. This is in contrast to one-pass encoding, which emphasizes speed, for example, when real-time encoding is needed such as live streaming. For example, in one-pass encoding, pre-set encoding parameter settings are used during the encoding process without any or much regard to a more thorough analysis of the characteristics of the media content as in two-pass encoding.

A variety of different characteristics of different portions, or GOPs, of the media content can be determined. FIG. 4 illustrates an example of determining characteristics of GOPs of media content. The content type of the GOPs of the media content can be determined (405). For example, different content types (e.g., of the videography), such as animation (e.g., CGI animation, cel animation, etc.), live-action, or a mix of animation and live-action of the GOPs can be determined by analyzing their image content. In some implementations, animated content can be determined by analyzing a GOP and determining that it includes a certain threshold range or number of small blocks (e.g., small coding units (CUs) of an image frame corresponding to residual coefficients, as previously discussed) having sharp areas, larger blocks having smoother areas but a level of detail below a threshold level of detail, etc. By contrast, live-action content might have more blurred edges rather than sharp edges, gradual colors rather than sudden color changes as in animation, etc.

Other characteristics of GOPs can also be determined, for example, noise level (410), image characteristics (415), and motion of objects among the frames of the GOPs (420). For example, the noise level can represent how much variation in unwanted brightness or color information exists in an image. The average noise level for the GOP can be determined by analyzing each image frame within the GOP and determining their noise levels. The noise levels for each image frame within the GOP can then be averaged together such that the GOP can be characterized as having an average noise level representative of each of the image frames within. In other implementations, the noise level for the GOP can be the highest or lowest noise level for a frame within the GOP. The noise level can indicate whether the GOP is grainy. Image characteristics can include determinations regarding how much distortion exists within a GOP, such as chroma or luma distortions, in a similar manner. Image characteristics can also include whether the image frames of the GOP are providing image data in interlaced or progressive scan methods.

Determining motion of objects among the frames of a GOP can include determining whether the residual coefficients of image frames of the GOP (or an average for all of the image frames of the GOP) are within a threshold range representative of a high amount of motion or movement of objects in the frame. In some implementations, some types of motion, such as vertical motion can be used to determine that a GOP represents textual content such as ending credits (e.g., GOP 140 in FIG. 1). The speed of the motion (e.g., whether objects are quickly moving among frames) can also be determined.

The characteristics can be stored, for example, in a log file in encoder info 215. Next, the encoding parameters for the GOPs can be set based on the characteristics that were determined and stored in encoder info 215 (310). For example, the characteristics of each GOP can be looked up in encoder info 215 and used to generate or adjust encoding parameters for encoding the GOPs.

The encoding parameters can include whether certain functionality of encoder 235 should be enabled during the second-pass encoding. For example, particular filters can be enabled, or disabled, depending on the content type. Animated content might be better encoded using one type of filter whereas live-action content might be better encoded with another type of filter. As another example, if the noise level for a GOP is within a threshold range (e.g., above 50 out of 100 in a 0-100 scale representing possible noise levels) then a noise filter can be indicated as enabled in the parameter settings such that it is applied during the second-pass encoding. The encoding parameters can also include values that can influence some of the functionality for encoder 235. For example, as previously discussed, the value for a quantization parameter can be determined and applied to residual coefficients as a form of compression.

In some implementations, the encoding parameters can also indicate the various quality levels that a GOP should be encoded. For example, GOPs can be encoded at various combinations of resolutions (e.g., 4K UHD, 1080p, 720p, etc.) and bitrates (e.g., indicating higher frame rates for the same quality level). As a result, one GOP might be encoded at 1080p and 720p whereas a second GOP might be encoded at 4K UHD, 1080p, and 720p quality levels. They may also be encoded at different bitrates. In one example, if encoding a GOP is determined to be difficult (e.g., would need more bits to be encoded), then the maximum quality level for the GOP to be encoded can be reduced.

The different quality levels that a GOP can be encoded at can also use different sets of encoding parameters. For example, a GOP can be encoded at 1080p and 720p. However, the 1080p encode might use a different set of encoding parameters than the 720p encode.

In some implementations, the encoding parameters for GOPs can be based on the characteristics or encoding parameters of other GOPs. For example, one GOP might be determined to have characteristics that result in a first set of encoding parameters, and a second GOP might be determined to have different characteristics that would result in a second set of encoding parameters. If the GOPs are adjacent to each other in the playback of media content 105 (e.g., such as GOP 125 and GOP 130 in FIG. 1), then the encoding parameters of one or both of the GOPs can be scaled, or modified, in respect to each other to reduce the perceptibility of transitions where there are large differences in encoding parameters. This might reduce jarring visual transitions as playback transitions from one GOP to another. As an example, the change in the value for the quantization parameter from the first to the second GOP might be limited to a certain percentage of the value of the quantization parameter for the first GOP.

Next, the encoder can encode each of the GOPs based on the encoding parameters (315). Each of the GOPs can be encoded in accordance with the encoding parameters determined for it based on their characteristics. As a result, the individual GOPs can be encoded differently during the second-pass of the multi-pass encoding rather than having all of media content 105 encoded with the same parameter settings. The encoded GOPs can then be provided to a viewer device for playback of the media content.

In some implementations, one GOP can be analyzed to determine its characteristics in a first-pass and then encoded in a second-pass. Next, a second GOP can then be analyzed and subsequently encoded. In other implementations, each GOP can be analyzed to determine their characteristics in a first-pass and then they can all be subsequently encoded in a second-pass. In some implementations, the encoding parameters can be refined in an iterative process. For example, multiple passes might be performed with encoding parameters being adjusted based on earlier results of the determination of the encoding parameters for the GOPs.

Though many of the examples disclosed herein use GOPs, other portions of media content may be used. For example, packets, scenes, frames, etc. can be used as the different portions to be encoded with different sets of encoding parameters.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
   determining characteristics of a first sequence of frames corresponding to a first temporal portion of media content during a first-pass of an encoding process, the characteristics of the first sequence of frames representing one or more attributes of the first sequence of frames prior to encoding of the first sequence of frames;
   determining characteristics of a second sequence of frames corresponding to a second temporal portion of the media content during the first-pass of the encoding process, the first temporal portion and the second temporal portion being different, the characteristics of the second sequence of frames representing one or more attributes of the second sequence of frames prior to encoding of the second sequence of frames;
   configuring a first encoder with first encoding parameters selected, at least in part, based on the characteristics of the first sequence of frames;
   encoding the first sequence of frames during a second-pass of the encoding process using the first encoder;
   configuring a second encoder with second encoding parameters selected, at least in part, based on the characteristics of the second sequence of frames, the second encoding parameters being different than the first encoding parameters; and
   encoding the second sequence of frames during the second-pass of the encoding process using the second encoder.

2. The method of claim 1, wherein encoding of the first sequence of frames results in first encoded content at a first plurality of quality levels, wherein encoding of the second sequence of frames results in second encoded content at a second plurality of quality levels, and wherein the second plurality of quality levels includes at least one quality level not included among the first plurality of quality levels.

3. The method of claim 2, further comprising generating manifest data including a first set of playback options for the first temporal portion of the media content and a second set of playback options for the second temporal portion of the media content, the first set of playback options corresponding to the first plurality of quality levels, the second set of playback options corresponding to the second plurality of quality levels.

4. The method of claim 1, wherein the first and second encoders are the same encoder configured with the first and second encoding parameters, respectively.

5. The method of claim 1, wherein the first and second temporal portions of the media content correspond to different groups of pictures (GOPs) of the media content.

6. The method of claim 1, further comprising determining the second encoding parameters with reference to the first encoding parameters.

7. The method of claim 1, wherein the characteristics of the first sequence of frames include one or more of a content type of the first sequence of frames, a noise level of the first sequence of frames, one or more image characteristics of the first sequence of frames, or motion information relating to one or more objects portrayed in the first sequence of frames.

8. A system, comprising one or more processors and memory configured to:
   determine characteristics of a first sequence of frames corresponding to a first temporal portion of media content during a first-pass of an encoding process, the characteristics of the first sequence of frames representing one or more attributes of the first sequence of frames prior to encoding of the first sequence of frames;
   determine characteristics of a second sequence of frames corresponding to a second temporal portion of the media content during the first-pass of the encoding process, the first temporal portion and the second temporal portion being different, the characteristics of the second sequence of frames representing one or more attributes of the second sequence of frames prior to encoding of the second sequence of frames;
   configure a first encoder with first encoding parameters selected, at least in part, based on the characteristics of the first sequence of frames;
   encode the first sequence of frames during a second-pass of the encoding process using the first encoder;
   configure a second encoder with second encoding parameters selected, at least in part, based on the characteristics of the second sequence of frames, the second encoding parameters being different than the first encoding parameters; and
   encode the second sequence of frames during the second-pass of the encoding process using the second encoder.

9. The system of claim 8, wherein the one or more processors and memory are configured to:
   encode the first sequence of frames resulting in first encoded content at a first plurality of quality levels; and
   encode the second sequence of frames resulting in second encoded content at a second plurality of quality levels, wherein the second plurality of quality levels includes at least one quality level not included among the first plurality of quality levels.

10. The system of claim 9, wherein the one or more processors and memory are further configured to generate manifest data including a first set of playback options for the first temporal portion of the media content and a second set of playback options for the second temporal portion of the media content, the first set of playback options corresponding to the first plurality of quality levels, the second set of playback options corresponding to the second plurality of quality levels.

11. The system of claim 8, wherein the first and second encoders are the same encoder configured with the first and second encoding parameters, respectively.

12. The system of claim 8, wherein the first and second temporal portions of the media content correspond to different groups of pictures (GOPs) of the media content.

13. The system of claim 8, wherein the one or more processors and memory are further configured to determine the second encoding parameters with reference to the first encoding parameters.

14. The system of claim 8, wherein the characteristics of the first sequence of frames include one or more of a content type of the first sequence of frames, a noise level of the first sequence of frames, one or more image characteristics of the first sequence of frames, or motion information relating to one or more objects portrayed in the first sequence of frames.

15. A computer program product, comprising one or more non-transitory computer-readable media having computer program instructions stored therein, the computer program instructions being configured such that, when executed by one or more computing devices, the computer program instructions cause the one or more computing devices to:
   determine characteristics of a first sequence of frames corresponding to a first temporal portion of media content during a first-pass of an encoding process, the characteristics of the first sequence of frames representing one or more attributes of the first sequence of frames prior to encoding of the first sequence of frames;

determine characteristics of a second sequence of frames corresponding to a second temporal portion of the media content during the first-pass of the encoding process, the first temporal portion and the second temporal portion being different, the characteristics of the second sequence of frames representing one or more attributes of the second sequence of frames prior to encoding of the second sequence of frames;

configure a first encoder with first encoding parameters selected, at least in part, based on the characteristics of the first sequence of frames;

encode the first sequence of frames during a second-pass of the encoding process using the first encoder;

configure a second encoder with second encoding parameters selected, at least in part, based on the characteristics of the second sequence of frames, the second encoding parameters being different than the first encoding parameters; and encode the second sequence of frames during the second-pass of the encoding process using the second encoder.

16. The computer program product of claim 15, wherein the computer program instructions are configured to cause the one or more computing devices to:

encode the first sequence of frames resulting in first encoded content at a first plurality of quality levels; and encode the second sequence of frames resulting in second encoded content at a second plurality of quality levels, wherein the second plurality of quality levels includes at least one quality level not included among the first plurality of quality levels.

17. The computer program product of claim 16, wherein the computer program instructions are further configured to cause the one or more computing devices to generate manifest data including a first set of playback options for the first temporal portion of the media content and a second set of playback options for the second temporal portion of the media content, the first set of playback options corresponding to the first plurality of quality levels, the second set of playback options corresponding to the second plurality of quality levels.

18. The computer program product of claim 15, wherein the first and second encoders are the same encoder configured with the first and second encoding parameters, respectively.

19. The computer program product of claim 15, wherein the first and second temporal portions of the media content correspond to different groups of pictures (GOPs) of the media content.

20. The computer program product of claim 15, wherein the computer program instructions are further configured to cause the one or more computing devices to determine the second encoding parameters with reference to the first encoding parameters.

* * * * *